US012583291B2

(12) United States Patent
Cho

(10) Patent No.: US 12,583,291 B2
(45) Date of Patent: Mar. 24, 2026

(54) AIR VENT APPARATUS FOR VEHICLE

(71) Applicant: HYUNDAI MOBIS Co., Ltd., Seoul (KR)

(72) Inventor: Young Min Cho, Cheonan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 627 days.

(21) Appl. No.: 17/939,092

(22) Filed: Sep. 7, 2022

(65) Prior Publication Data

US 2023/0073401 A1     Mar. 9, 2023

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .......... B60H 1/3421; B60H 2001/3471; B60H 2001/3492; B60Y 2306/09
USPC ....................................................... 454/155
See application file for complete search history.

(56) References Cited

U.S. PATENT DOCUMENTS

2021/0039478 A1* 2/2021 Lottes .................. B60H 1/3421

FOREIGN PATENT DOCUMENTS

| JP | H07-40922 Y2 | 1/1992 |
| KR | 10-2013-0005100 A | 1/2013 |
| KR | 10-2046809 B1 | 11/2019 |
| KR | 20200124494 A * | 11/2020 |

OTHER PUBLICATIONS

Office Action issued in corresponding Korean Patent Application No. 10-2021-0119355 dated Oct. 31, 2025, with English translation.

* cited by examiner

*Primary Examiner* — Allen R. B. Schult
*Assistant Examiner* — William C Weinert
(74) *Attorney, Agent, or Firm* — MORGAN, LEWIS & BOCKIUS LLP

(57)     ABSTRACT

Provided is an air vent apparatus for a vehicle configured to discharge air into the interior of the vehicle according to one embodiment of the present disclosure including a duct housing having a vent hole located in an air discharge path, a front wing configured to open and close the vent hole of the duct housing, and having a structure in which a plurality of wings overlap each other when adjusted to be closed, and a spacer interposed between the duct housing and the front wing to block an air leak into the interior of the vehicle when the front wings overlap each other.

12 Claims, 6 Drawing Sheets

FRONT

RIGHT

LEFT

REAR

C-C'

D-D'

AIR VENT APPARATUS FOR VEHICLE

CROSS-REFERENCE TO RELATED APPLICATION

This application claims priority to and the benefit of Korean Patent Application No. 10-2021-0119355, filed on Sep. 7, 2021, the disclosure of which is incorporated herein by reference in its entirety.

BACKGROUND

1. Field of the Disclosure

The present disclosure relates to an air vent apparatus for a vehicle.

2. Discussion of Related Art

In general, air vent apparatuses for a vehicle are provided with an outlet through which air is discharged into the interior of a vehicle, and a front wing and a rear wing are provided in an air circulation path to adjust a wind direction and a wind volume in up, down, left, and right directions.

As shown in FIGS. 1 to 3, a conventional air vent apparatus 10 has a structure in which a lower spacer 13 and an upper spacer 14 having a dam shape are disposed above and under each front wing 12 to be exposed to the outside in order to solve an air leak problem due to the occurrence of a gap between the front wings 12 vertically arranged in a duct housing 11 when the outlet is discharged.

However, such a conventional structure is a structure in which a wind resistance is inevitably reduced when the front wing 12 is in an open state, adversely affects performance such as wind directions, noise, and the like, and is frustrating in terms of appearance and thus disappoints in terms of design.

SUMMARY OF THE DISCLOSURE

The present disclosure is directed to providing an air vent apparatus for a vehicle capable of achieving an improvement in performance and at the same time, blocking an air leak even when a spacer is not exposed externally by configuring an inner structure of a duct housing in a step form.

The object of the present disclosure is not limited to the above-mentioned objects, and other objects not mentioned herein will be clearly understood by those skilled in the art from the following description.

According to an aspect of the present disclosure, there is provided an air vent apparatus for a vehicle configured to discharge air into an interior of the vehicle including a duct housing having a vent hole located in an air discharge path, a front wing configured to open and close the vent hole of the duct housing and having a structure in which a plurality of wings overlap each other when adjusted to be closed, and a spacer interposed between the duct housing and the front wing to block an air leak into the interior of the vehicle when the front wings overlap each other.

The duct housing may have a stepped structure gradually toward a front including a section in which the spacer is seated so that the spacer is not exposed to the outside in a state of being seated therein.

The duct housing may include a rear stepped portion protruding inward in a partial section of a rear to surround the spacer at the rear so that the spacer is not exposed to the interior of the vehicle, and a front stepped portion protruding inward in a partial section of a front to surround a rotation shaft at the rear in a state of being spaced apart from the rotation shaft of the front wing.

The rear stepped portion and the front stepped portion may protrude into the duct housing in a state of being stepped.

The rear stepped portion may have an inclined structure in which a width is increased toward an interior of the vehicle from an outside directed to the interior of the vehicle.

The spacer may include a lower spacer formed at a lower portion of the duct housing in a transverse direction, guided to a lower duct rail of the duct housing, and slid in the transverse direction, and an upper spacer formed at an upper portion of the duct housing in the transverse direction, guided to an upper duct rail of the duct housing, and slid in the transverse direction.

The upper and lower duct rails may be formed as any one path of straight and curved lines.

The spacer may be snap-fit fastened within the duct housing.

Meanwhile, an air vent apparatus for a vehicle according to another embodiment of the present disclosure includes a duct housing having a hollow shape located in an air discharge path, a front wing rotated and adjusted within the duct housing, configured to open and close air discharged into an interior of the vehicle, and having a structure in which a plurality of wings overlap each other when adjusted to be closed, and a spacer interposed between the duct housing and the front wing to block an air leak into the interior of the vehicle when the front wings overlap each other.

In particular, the duct housing may be formed in a shape in which a partial section therein corresponds to a path in which the front wings overlap each other and may have a stepped protrusion structure from one side to the other side in a width direction of the duct housing.

The duct housing may include a rear stepped portion protruding inward in a partial section of a rear to surround the spacer at the rear so that the spacer is not exposed to the interior of the vehicle, and a front stepped portion protruding inward in a partial section of a front to surround a rotation shaft at the rear in a state of being spaced apart from the rotation shaft of the front wing.

The rear stepped portion and the front stepped portion may protrude into the duct housing in a state of being stepped.

According to the present disclosure, in an air vent apparatus for a vehicle, an inner structure of a duct housing can be configured in a stepped form, thereby achieving the improvement in performance and at the same time, blocking an air leak even when the spacer is not exposed externally.

In particular, according to the present disclosure, since a Coanda effect can occur even when the lower spacer and the upper spacer are not exposed to the outside by improving the shape of the duct housing, it is advantageous to secure the quality due to the reduction in the wind direction and noises.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

Figure 1:
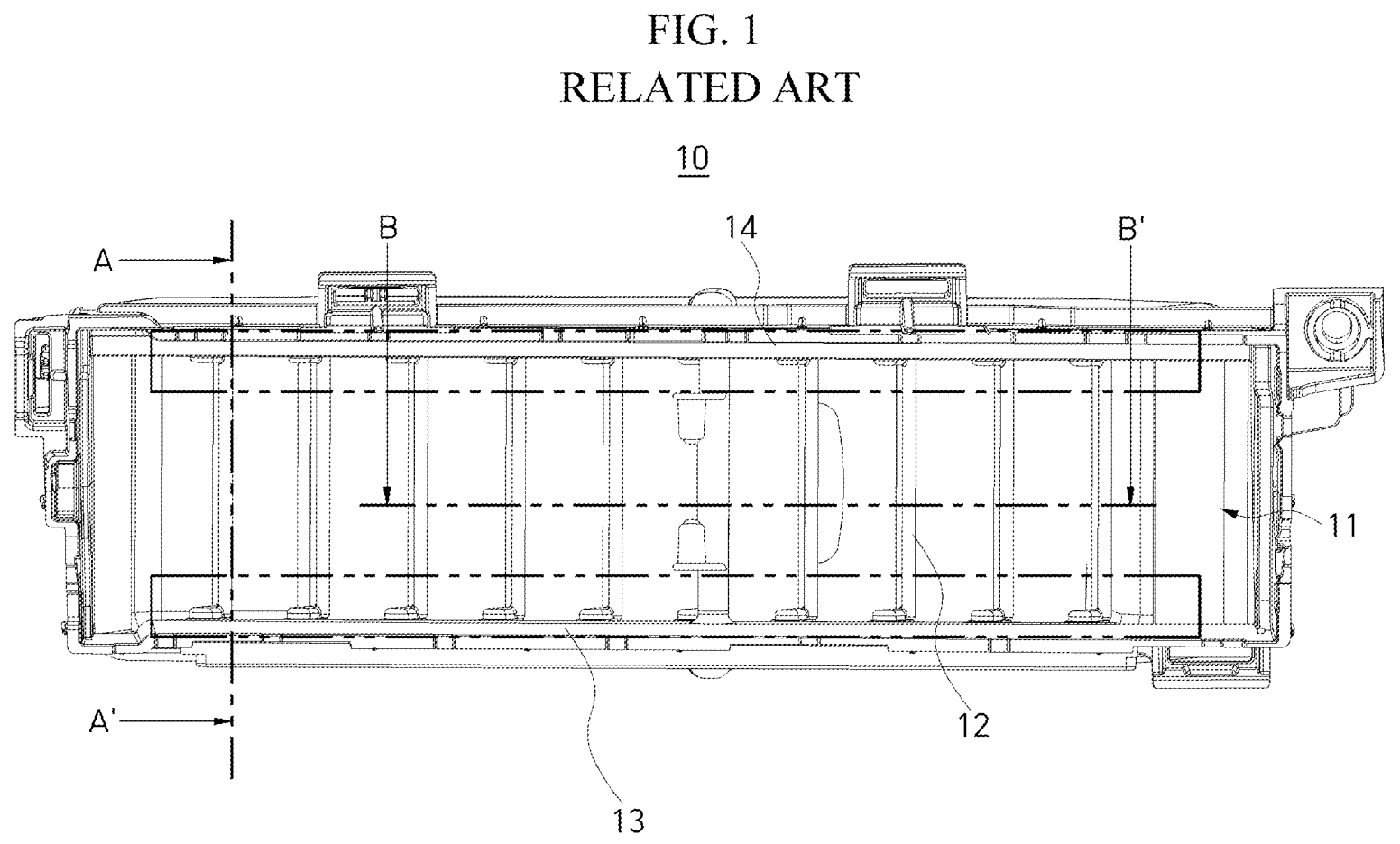

FIG. 1 is a plan view schematically showing a conventional air vent apparatus;

Figure 3:
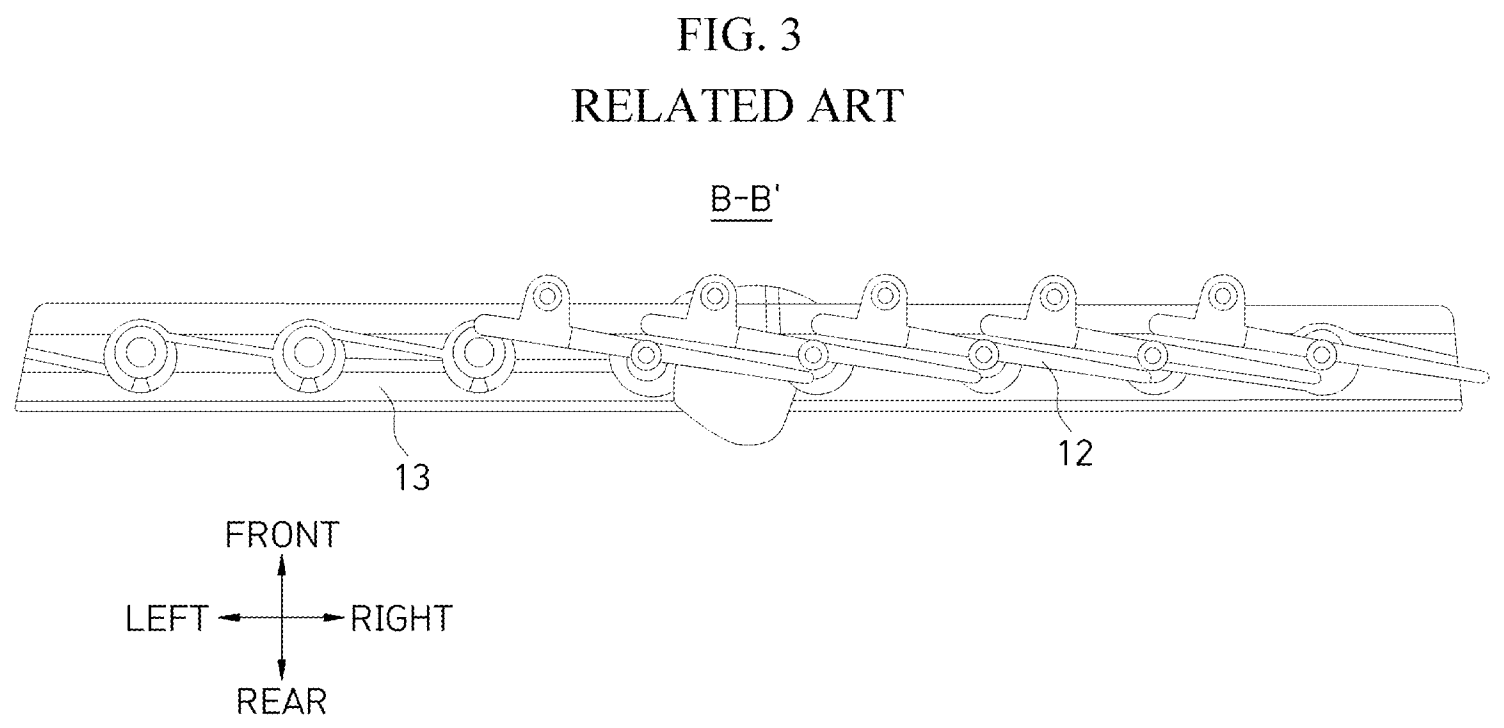

FIG. 3 is a cross-sectional view taken along line B-B' indicated in FIG. 1;

DETAILED DESCRIPTION OF EXEMPLARY EMBODIMENTS

Advantages and features of the present disclosure and methods of achieving them will be made clear from embodiments described in detail below with reference to the accompanying drawings. However, the present disclosure is not limited to embodiments disclosed below but will be implemented in various different forms, and these embodiments are only provided so that the disclosure of the present disclosure will be thorough and complete and will fully convey the scope of the present disclosure to those skilled in the art to which the present disclosure pertains, and the present disclosure is defined by the description of the claims. Meanwhile, terms used herein are for the purpose of describing the embodiments and are not intended to limit the present disclosure. In the present specification, the singular forms include the plural forms as well unless the context clearly indicates otherwise. The terms "comprise" or "comprising" used herein do not preclude the presence or addition of one or more other elements, steps, operations, and/or devices other than stated elements, steps, operations, and/or devices. As used in the present specification, the term "and/or" includes any one of the corresponding listed items and all combinations of one or more of them.

Hereinafter, embodiments of the present disclosure will be described in detail with reference to the accompanying drawings.

Figure 2:
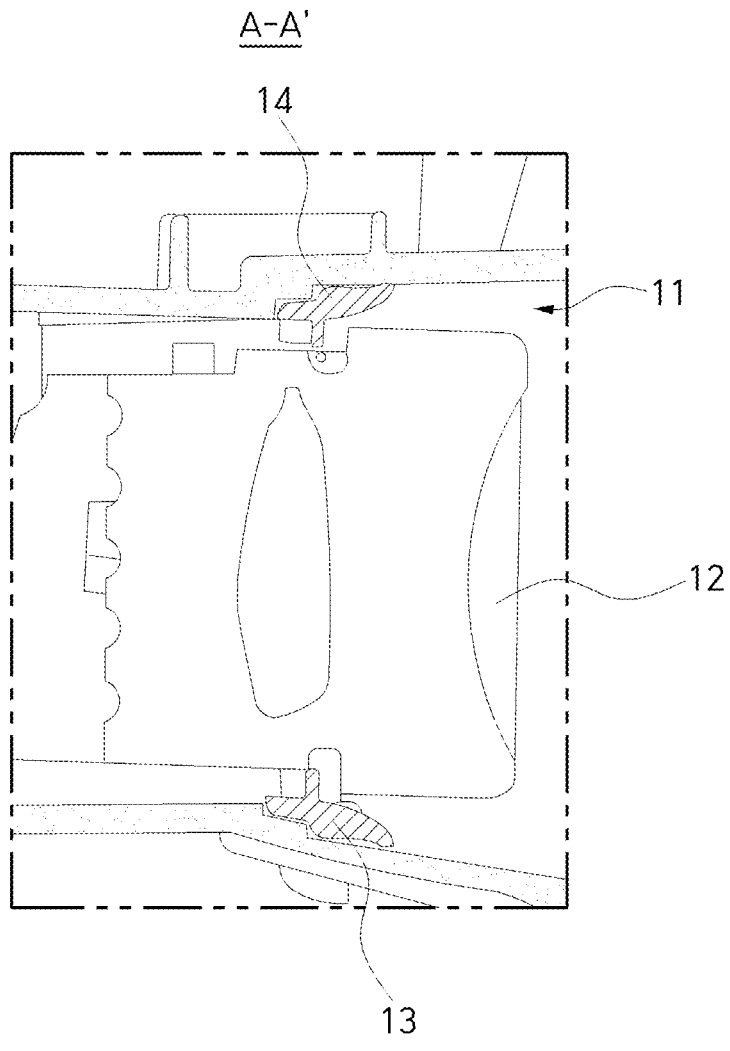
FIG. 2 is a cross-sectional view taken along line A-A' indicated in FIG. 1.
Figure 4:
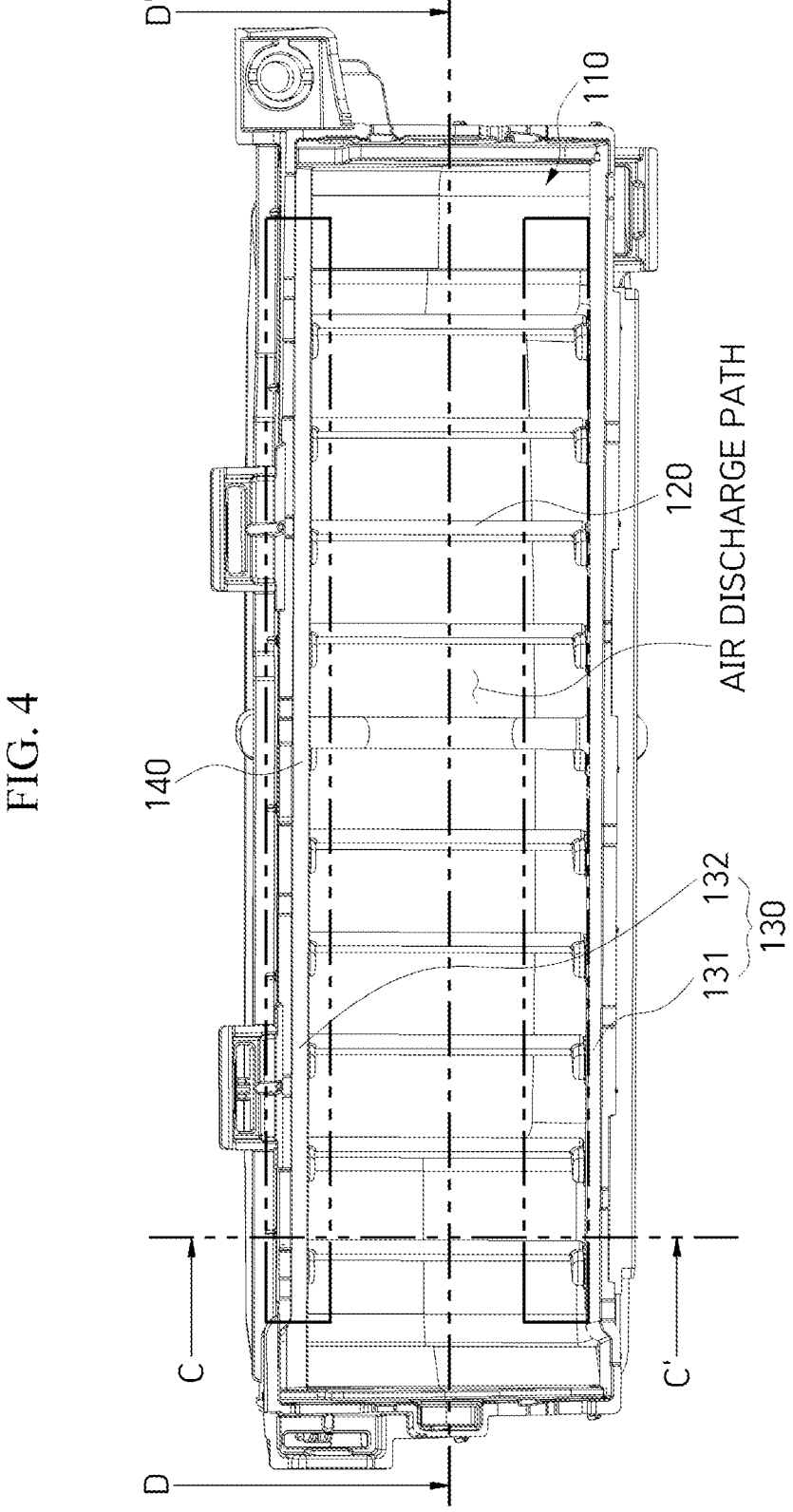
FIG. 4 is a plan view schematically showing an air vent apparatus according to one embodiment of the present disclosure.

FIG. 4 is a plan view schematically showing an air vent apparatus according to one embodiment of the present disclosure.

Referring to FIG. 4, an air vent apparatus for a vehicle 100 includes a duct housing 110, a front wing 120, and a spacer 130.

The duct housing 110 forms an exterior of the air vent apparatus 100 and has a vent hole in an air discharge path. Here, the vent hole serves as an outlet through which air is discharged into the interior of a vehicle.

The front wing 120 has a configuration to open and close the vent hole of the duct housing 110, and has a structure in which a plurality of wings overlap each other when adjusted to be closed.

In the front wing 120, a gap difference between the wings is reduced by a wind pressure to block an air leak when the vent hole of the duct housing 110 is closed. This is possible because a rotation shaft is connected to and overlaps each of the plurality of wings in a different form.

The spacer 130 is interposed between the duct housing 110 and the front wing 120 to block an air leak into the interior of the vehicle when the front wings 120 overlap each other.

The spacer 130 may be snap-fit fastened within the duct housing 110.

Figure 5:
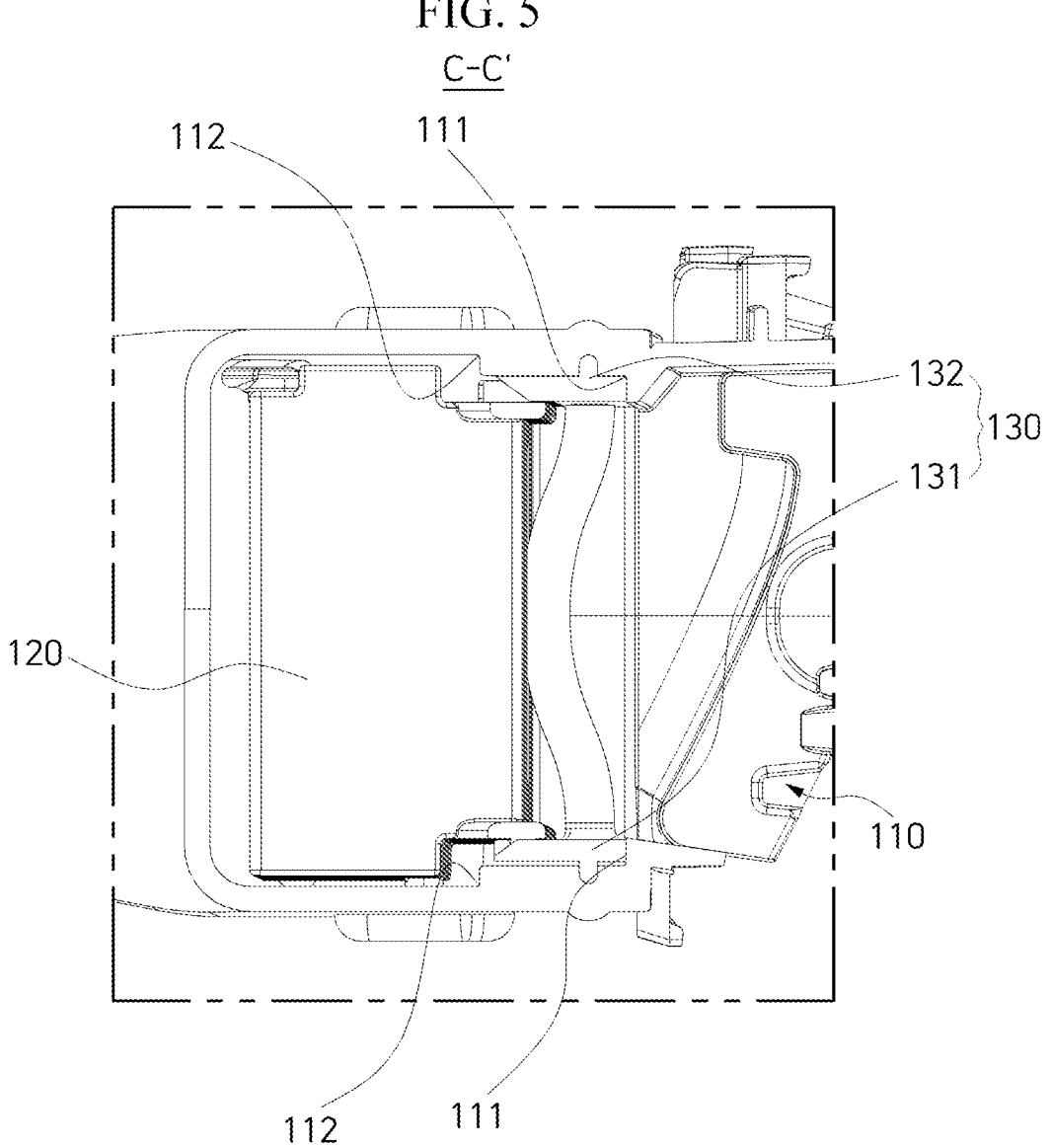
FIG. 5 is a cross-sectional view taken along line C-C' indicated in FIG. 4.
Figure 6:
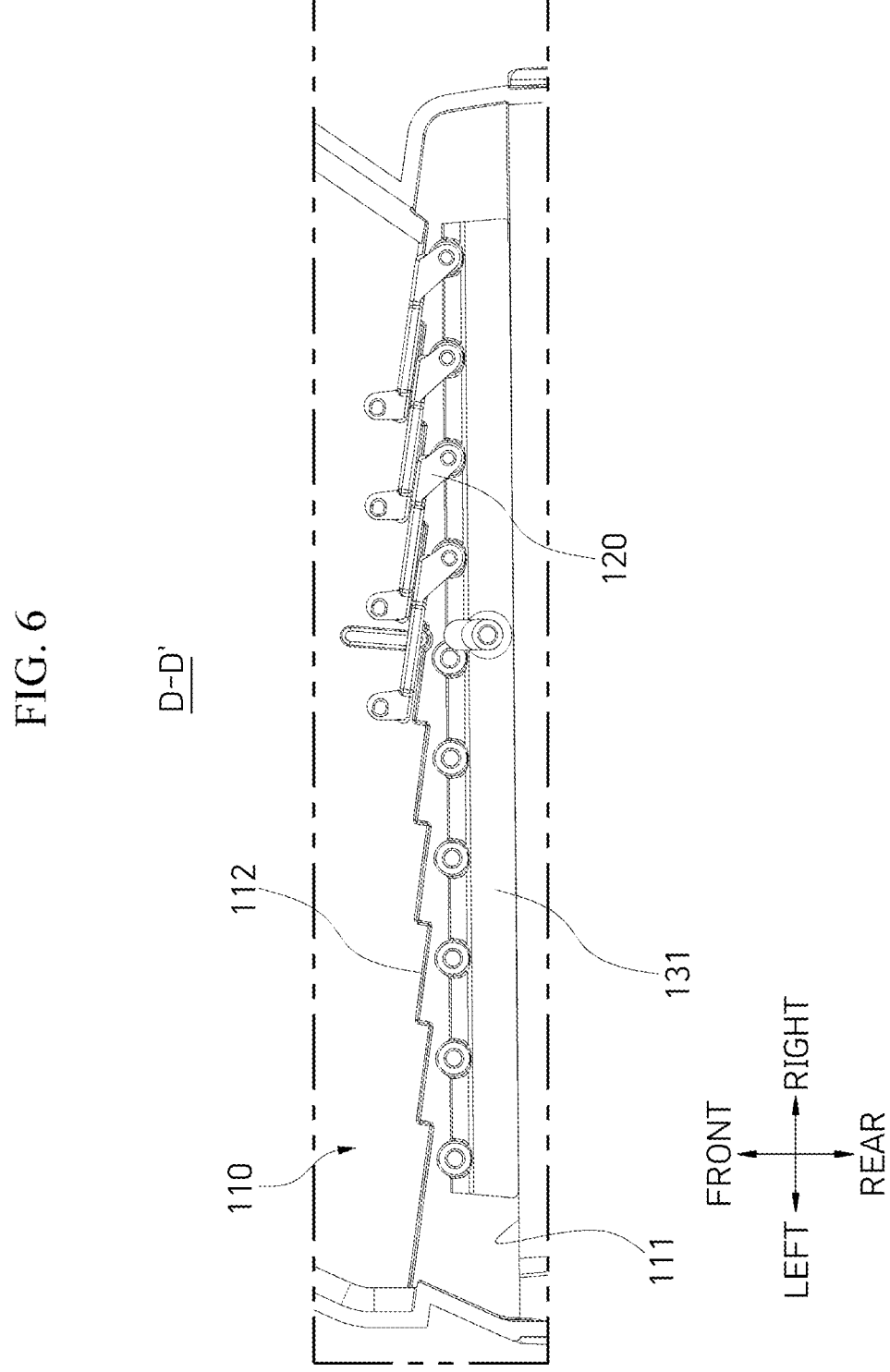
FIG. 6 is a cross-sectional view taken along line D-D' indicated in FIG. 4.

FIG. 5 is a cross-sectional view taken along line C-C' indicated in FIG. 4, and FIG. 6 is a cross-sectional view taken along line D-D' indicated in FIG. 4.

Referring to FIGS. 5 and 6, the spacer 130 includes a lower spacer 131 and an upper spacer 132.

The lower spacer 131 is formed at a lower portion of the duct housing 110 in a transverse direction. The lower spacer 131 may be guided to a lower duct rail (not shown) of the duct housing 110 and slid in the traverse direction.

The upper spacer 132 is formed at an upper portion of the duct housing 110 in the transverse direction. The upper spacer 132 may be guided to an upper duct rail (not shown) of the duct housing 110 and slid in the transverse direction.

Here, the upper and lower duct rails may be formed as any one path of straight and curved lines.

The duct housing 110 has a stepped structure gradually toward a front including a section where the lower spacer 131 and the upper spacer 132 are seated so that the lower spacer 131 and the upper spacer 132 are not exposed to the outside in a state of being seated therein.

As another example, the duct housing 110 may be formed in a shape in which a partial section therein corresponds to a path in which the front wings 120 overlap each other. At this point, the duct housing 110 may have a stepped protrusion structure from one side to the other side in a width direction.

The duct housing 110 includes a rear stepped portion 111 and a front stepped portion 112.

The rear stepped portion 111 protrudes inward in a partial section of a rear of the duct housing 110 to surround the lower spacer 131 and the upper spacer 132 at the rear so that the lower spacer 131 and the upper spacer 132 are not exposed to the interior of the vehicle.

The front stepped portion 112 protrudes inward in a partial section of a front of the duct housing 110 to surround the corresponding rotation shaft at the rear in a state of being spaced apart from the rotation shaft of the front wing 120.

The rear stepped portion 111 and the front stepped portion 112 may protrude into the duct housing 110 in a state of being stepped.

The rear stepped portion 111 may have an inclined structure in which a width is increased toward the interior of the vehicle at an outside directed to the interior of the vehicle.

The present disclosure is not limited to the above-described embodiments, and may be variously modified and practiced without departing from the technical spirit of the present disclosure.

What is claimed is:

1. An air vent apparatus for a vehicle configured to discharge air into an interior of the vehicle, the air vent apparatus comprising:

a duct housing having a vent hole located in an air discharge path;

a front wing configured to open and close the vent hole of the duct housing, and having a plurality of wings overlapping each other when adjusted to be closed; and a spacer interposed between the duct housing and the front wing to block an air leak into the interior of the vehicle when the plurality of wings of the front wing overlap each other, wherein the duct housing has a stepped structure gradually inclined toward a front including a section in which the spacer is seated so that the spacer is not exposed to an outside in a state of being seated therein, wherein the stepped structure comprises at least one stepped portion that covers a rear surface of the spacer, the rear surface facing the interior of the vehicle, wherein an inner width of the duct housing decreases at the rear surface of the spacer and subsequently increases toward an outlet of the air discharge path.

2. The air vent apparatus of claim 1, wherein the at least one stepped portion includes:

a rear stepped portion protruding inward in a partial section of a rear and configured to surround the spacer at the rear so that the spacer is not exposed to the interior of the vehicle; and a front stepped portion protruding inward in a partial section of a front and configured to surround a rotation shaft at the rear in a state of being spaced apart from the rotation shaft of the front wing.

3. The air vent apparatus of claim 2, wherein the rear stepped portion and the front stepped portion protrude into the duct housing in a state of being stepped.

4. The air vent apparatus of claim 2, wherein the rear stepped portion has an inclined structure in which the inner width of the duct housing increases toward the interior of the vehicle at an outside directed to the interior of the vehicle.

5. The air vent apparatus of claim 1, wherein the spacer includes:

a lower spacer disposed at a lower portion of the duct housing in a transverse direction, guided to a lower duct rail of the duct housing, and slid in the transverse direction; and an upper spacer disposed at an upper portion of the duct housing in the transverse direction, guided to an upper duct rail of the duct housing, and slid in the transverse direction.

6. The air vent apparatus of claim 5, wherein the upper and lower duct rails are configured as a straight line or a curved line.

7. The air vent apparatus of claim 1, wherein the spacer is snap-fit fastened within the duct housing.

8. The air vent apparatus of claim 1, wherein the spacer is interposed between the duct housing and the front wing in a height direction parallel to rotation axes of the plurality of wings, wherein the spacer is disposed above and/or below the front wing along the height direction.

9. An air vent apparatus for a vehicle configured to discharge air into an interior of the vehicle, the air vent apparatus comprising:

a duct housing having a hollow shape located in an air discharge path;

a front wing rotatable and adjustable within the duct housing, configured to open and close the air discharge path, and having a plurality of wings overlapping each other when adjusted to be closed; and a spacer interposed between the duct housing and the front wing to block an air leak into the interior of the vehicle when the plurality of wings of the front wing overlap each other, wherein a partial section of the duct housing has a shape corresponding to a path in which the plurality of wings of the front wing overlap each other, and has a stepped structure extending in a width direction from one side to another side of the duct housing, wherein the stepped structure comprises at least one stepped portion that covers a rear surface of the spacer, the rear surface facing the interior of the vehicle, wherein an inner width of the duct housing decreases at the rear surface of the spacer and subsequently increases toward an outlet of the air discharge path.

10. The air vent apparatus of claim 9, wherein the at least one stepped portion includes:

a rear stepped portion protruding inward in a partial section of a rear and configured to surround the spacer at the rear so that the spacer is not exposed to the interior of the vehicle; and a front stepped portion protruding inward in a partial section of a front and configured to surround a rotation shaft at the rear in a state of being spaced apart from the rotation shaft of the front wing.

11. The air vent apparatus of claim 10, wherein the rear stepped portion and the front stepped portion protrude into the duct housing in a state of being stepped.

12. The air vent apparatus of claim 9, wherein the spacer is interposed between the duct housing and the front wing in a height direction parallel to rotation axes of the plurality of wings, wherein the spacer is disposed above and/or below the front wing along the height direction.

* * * * *